US012633646B2

(12) United States Patent
Ohara

(10) Patent No.: US 12,633,646 B2
(45) Date of Patent: May 19, 2026

(54) ELECTRONIC DEVICE

(71) Applicant: Panasonic Intellectual Property Management Co., Ltd., Osaka (JP)

(72) Inventor: Kazuki Ohara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 99 days.

(21) Appl. No.: 18/643,696

(22) Filed: Apr. 23, 2024

(65) Prior Publication Data

US 2024/0275026 A1 Aug. 15, 2024

Related U.S. Application Data

(63) Continuation of application No. PCT/JP2022/037987, filed on Oct. 12, 2022.

(30) Foreign Application Priority Data

Nov. 12, 2021 (JP) ................................ 2021-185118

(51) Int. Cl.
*H01Q 1/24* (2006.01)
*H01Q 1/42* (2006.01)
*H01Q 21/08* (2006.01)

(52) U.S. Cl.
CPC ................ *H01Q 1/24* (2013.01); *H01Q 1/42* (2013.01); *H01Q 21/08* (2013.01)

(58) Field of Classification Search
CPC ............ H01Q 1/24; H01Q 1/42; H01Q 21/08
See application file for complete search history.

(56) References Cited

U.S. PATENT DOCUMENTS

2007/0247388 A1 10/2007 Asakura et al.
2010/0302109 A1 12/2010 Takezaki
(Continued)

FOREIGN PATENT DOCUMENTS

JP 2007-194915 A 8/2007
JP 2010-278901 A 12/2010
(Continued)

OTHER PUBLICATIONS

International Search report for corresponding Application No. PCT/JP2022/037987, mailed Dec. 20, 2022.

*Primary Examiner* — Hai V Tran
(74) *Attorney, Agent, or Firm* — Renner, Otto, Boisselle & Sklar, LLP

(57) ABSTRACT

An electronic device includes an antenna module that performs communication at a predetermined communication frequency, and a housing that includes a predetermined surface and a recess provided in the predetermined surface. The antenna module is accommodated within the recess such that a surface direction perpendicular to an antenna surface of the antenna module coincides with a surface direction perpendicular to the predetermined surface. The predetermined surface includes a first region and a second region that are opposite to each other with respect to the recess in a width direction of the antenna surface. The housing includes a protrusion having conductivity in the first region. A distal end of the protrusion protrudes further in the surface direction of the antenna surface than the antenna surface. The second region does not protrude further in the surface direction of the antenna surface than the antenna surface.

15 Claims, 12 Drawing Sheets

(56) References Cited

U.S. PATENT DOCUMENTS

| | | | | |
|---|---|---|---|---|
| 2011/0063779 | A1 | 3/2011 | Ochi et al. | |
| 2011/0249415 | A1 | 10/2011 | Takezaki | |
| 2017/0222312 | A1 | 8/2017 | Sudo et al. | |
| 2019/0280376 | A1 | 9/2019 | Sudo et al. | |
| 2020/0259258 | A1* | 8/2020 | Amiri | H01Q 5/378 |
| 2020/0287268 | A1* | 9/2020 | Moon | H01Q 1/2208 |
| 2020/0381804 | A1* | 12/2020 | Park | H01Q 9/16 |
| 2021/0005955 | A1* | 1/2021 | Sudo | H01Q 1/523 |
| 2021/0242569 | A1 | 8/2021 | Fujii et al. | |
| 2021/0328362 | A1* | 10/2021 | Park | H01Q 19/06 |
| 2024/0145899 | A1* | 5/2024 | Kikuchi | H01Q 1/246 |

FOREIGN PATENT DOCUMENTS

| | | | |
|---|---|---|---|
| WO | 2009/022387 | A1 | 2/2009 |
| WO | 2016/059961 | A1 | 4/2016 |
| WO | 2020/090391 | A1 | 5/2020 |

* cited by examiner

ELECTRONIC DEVICE

BACKGROUND

1. Technical Field

The present disclosure relates to an electronic device.

2. Description of the Related Art

Patent Literature (PTL) 1 discloses an antenna module housing structure in which an antenna module constructed by forming an antenna on a substrate is housed in a housing. The housing is made of resin and has a hollow box shape, and side plates having rectangular shapes are formed on surfaces of a hexahedron. An RF antenna module is housed within the side plate positioned in front of the housing by the antenna module housing structure.

PTL 1 is International Publication No. WO 2016/059961.

SUMMARY

In the antenna module housing structure of PTL 1, the RF antenna module radiates millimeter radio waves to a front side of a front surface of the side plate exposed to an outside of the housing by a patch antenna constituting a front direction radiation antenna.

In PTL 1, as a method for changing ae radiation direction of the millimeter radio waves, it is conceivable to incline the antenna module with respect to the side plate of the housing. When the antenna module is inclined with respect to the side plate, a distance between the antenna module and the side plate is not uniform. This may contribute to a decrease in antenna performance of the antenna module.

The present disclosure provides an electronic device capable of inclining a main radiation direction of an antenna module with respect to a housing without inclining the antenna module with respect to the housing.

An electronic device according to an aspect of the present disclosure includes an antenna module that performs communication at a predetermined communication frequency, and a housing that includes a predetermined surface and a recess provided in the predetermined surface. The antenna module is accommodated within the recess such that a surface direction perpendicular to an antenna surface of the antenna module coincides with a surface direction perpendicular to the predetermined surface. The predetermined surface includes a first region and a second region that are opposite to each other with respect to the recess in a width direction of the antenna surface. The housing includes a protrusion having conductivity in the first region. A distal end of the protrusion protrudes further in the surface direction of the antenna surface than the antenna surface. The second region does not protrude further in the surface direction of the antenna surface than the antenna surface.

According to the aspect of the present disclosure, the main radiation direction of the antenna module can be inclined with respect to the housing without inclining the antenna module with respect to the housing.

DETAILED DESCRIPTION

1. Exemplary Embodiment

Figure 1:
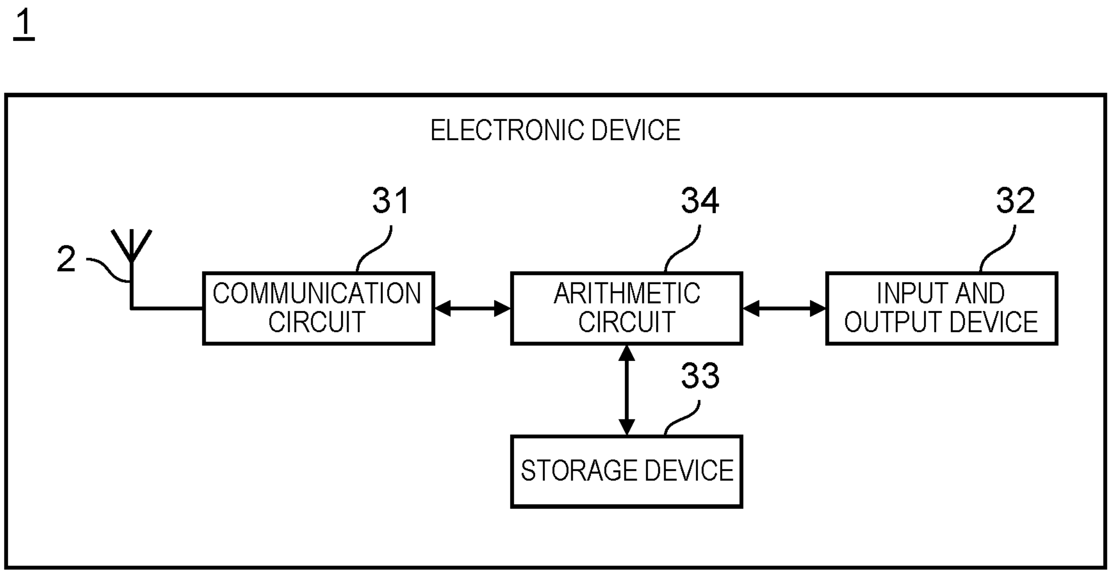
FIG. 1 is a block diagram of a configuration example of a circuit of an electronic device according to an exemplary embodiment.

Hereinafter, an exemplary embodiment will be described in detail with appropriate reference to the drawings. However, descriptions more in detail than necessary may be omitted. For example, the detailed description of already well-known matters and the redundant description of substantially identical configurations may be omitted. These omissions are intended to avoid excessive redundancy in the following description, and to facilitate understanding of those skilled in the art. Note that, the inventor(s) of the present disclosure provide the accompanying drawings and the following description to help those skilled in the art to fully understand the present disclosure and thus do not intend to limit the subject matter defined in the appended claims thereby.

A positional relationship such as up, down, left, and right is based on a positional relationship illustrated in the drawings unless otherwise specified. Each of the drawings to be described in the following exemplary embodiment is a schematic view, and a ratio of a size and a thickness of each component in each drawing does not necessarily reflect an actual dimensional ratio. A dimensional ratio of each component is not limited to a ratio illustrated in the drawings.

[1.1 Configuration]

FIG. 1 is a block diagram of a configuration example of a circuit of electronic device 1 according to the exemplary embodiment. Electronic device 1 in FIG. 1 is a laptop computer. As illustrated in FIG. 1, electronic device 1 includes antenna module 2, communication circuit 31, input and output device 32, storage device 33, and arithmetic circuit 34.

Antenna module 2 is used for performing communication at a predetermined communication frequency. As will be described in detail later, antenna module 2 includes a plurality of antenna elements 21 on antenna surface 20. Antenna module 2 is used to transmit and receive radio waves having a predetermined communication frequency. The predetermined communication frequency is included in, for example, a frequency bandwidth of 24.250 GHz to 52.600 GHz. The frequency band of 24.250 GHz to 52.600 GHz is defined as an FR2 frequency bandwidth for 5G NR. FR2 further includes frequency bandwidths represented by bandwidth numbers of n257, n258, n260, and n261. n257 and n261 are 28 GHz bands. n258 is a 26 GHz band. n260 is a 39 GHz band. Hence, antenna module 2 is an antenna module of a quasi-millimeter wave band to a millimeter wave band. Antenna module 2 is used for wireless communication between electronic device 1 and an external device.

Communication circuit 31 is connected to antenna module 2. Communication circuit 31 is connected to communicate with an external device or system via antenna module 2. Communication circuit 31 includes one or more communication interfaces. Communication circuit 31 conforms to a predetermined communication protocol. The predetermined communication protocol can be selected from a variety of well-known wired and wireless communication standards.

Figure 2:
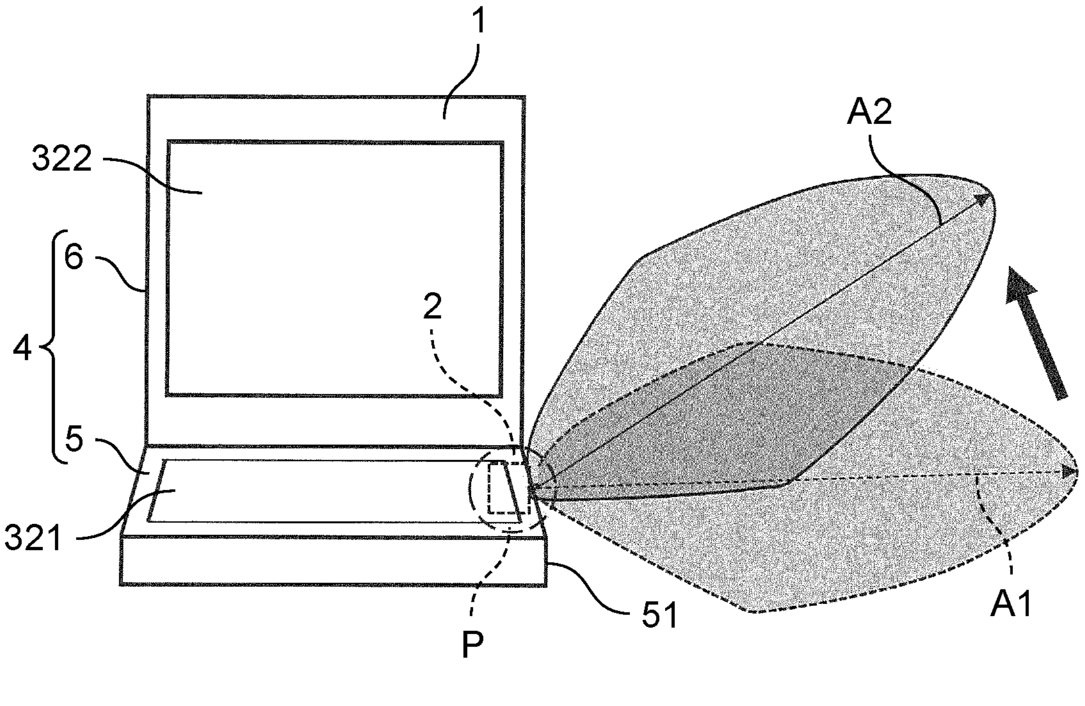
FIG. 2 is a schematic perspective view of the electronic device in FIG. 1.

Input and output device 32 functions as an input device for inputting information from a user and an output device for outputting information to the user. That is, input and output device 32 is used to input information to electronic device 1 and output information from electronic device 1. Input and output device 32 includes one or more human-machine interfaces. Examples of the human-machine interfaces include an input device such as a keyboard, a pointing device (mouse, track ball, or the like), or a touch pad, an output device such as a display or a speaker, and an input and output device such as a touch panel. In FIG. 2, input and output device 32 includes keyboard 321 and display 322. Input and output device 32 may include one or more connectors. Examples of the one or more connectors include an earphone jack, a USB connector, a LAN connector, an HDMI (registered trademark) connector, a DVI connector, and a D-sub connector.

Storage device 33 is used to store information used by arithmetic circuit 34 and information generated by arithmetic circuit 34. Storage device 33 includes one or more storages (non-transitory storage media). The storage may be, for example, any one of a hard disk drive (HDD), an optical drive, or a solid state drive (SSD).

Arithmetic circuit 34 is a circuit that controls an operation of electronic device 1. Arithmetic circuit 34 is connected to communication circuit 31 and input and output device 32 and can access storage device 33. Arithmetic circuit 34 can be implemented by, for example, a computer system including one or more processors (microprocessors) and one or more memories. One or more processors execute a program (stored in one or more memories or storage devices 33) to implement a predetermined function. In this example, the program is recorded in advance in storage device 33. Alternatively, the program may be provided via a telecommunication line such as the Internet or by being recorded in a non-transitory recording medium such as a memory card.

FIG. 2 is a schematic perspective view of electronic device 1 in FIG. 1. Electronic device 1 includes housing 4 that accommodates antenna module 2, communication circuit 31, input and output device 32, storage device 33, and arithmetic circuit 34.

Housing 4 in FIG. 2 includes first housing 5 and second housing 6. First housing 5 corresponds to a base or a bottom of the laptop computer. First housing 5 has a flat rectangular parallelepiped shape. First housing 5 accommodates antenna module 2, communication circuit 31, input and output device 32 excluding display 322, storage device 33, and arithmetic circuit 34. Keyboard 321 is disposed on an upper surface of first housing 5. Second housing 6 corresponds to a cover of the laptop computer. Second housing 6 has a flat rectangular parallelepiped shape. Second housing 6 accommodates display 322. Second housing 6 is rotatably attached to first housing 5 between an open position where display 322 is visible to the user and a closed position where display 322 is invisible to the user. Since second housing 6 is rotatable with respect to first housing 5, a length direction, a width direction, and a thickness direction of housing 4 are determined with first housing 5 as a reference. That is, a length direction, a width direction, and a thickness direction of first housing 5 correspond to the length direction, the width direction, and the thickness direction of housing 4, respectively.

In the present exemplary embodiment, first housing 5 has conductivity. First housing 5 is made of a conductive material such as a metal material. The metal material is, for example, magnesium.

Next, the disposition of antenna module 2 will be described in detail. As indicated by P in FIG. 2, antenna module 2 is near predetermined surface 51 of first housing 5 of housing 4. In the present exemplary embodiment, predetermined surface 51 is a side surface of first housing 5 in the length direction. The length direction of predetermined surface 51 coincides with the width direction of first housing 5. A width direction of predetermined surface 51 coincides with the thickness direction of first housing 5. In particular, in FIG. 2, predetermined surface 51 is a right side surface positioned on a right side of the user when electronic device 1 is used.

Figure 3:
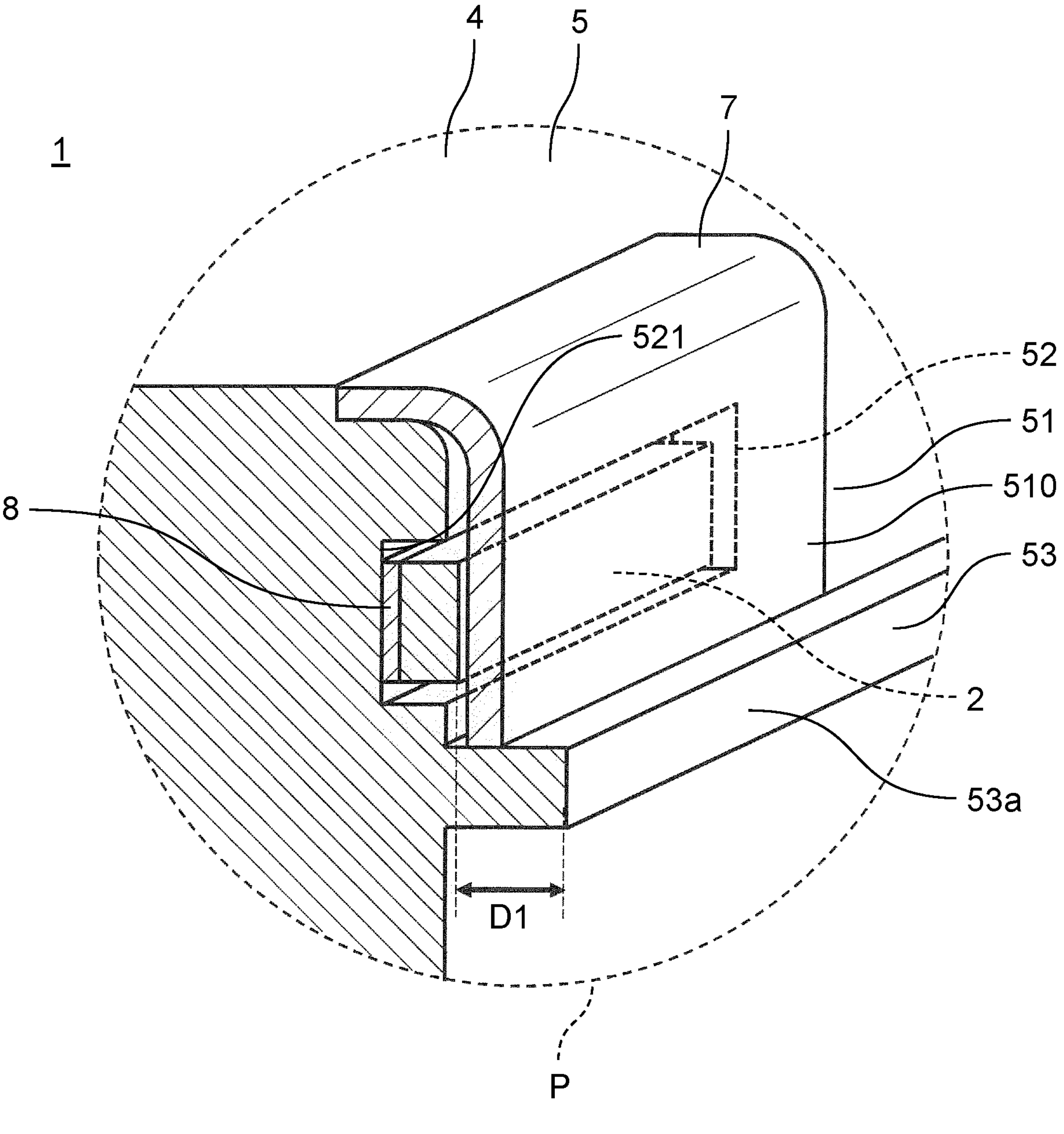
FIG. 3 is a partial perspective view in which a part of a portion indicated by P in FIG. 2 is cut out.
Figure 4:
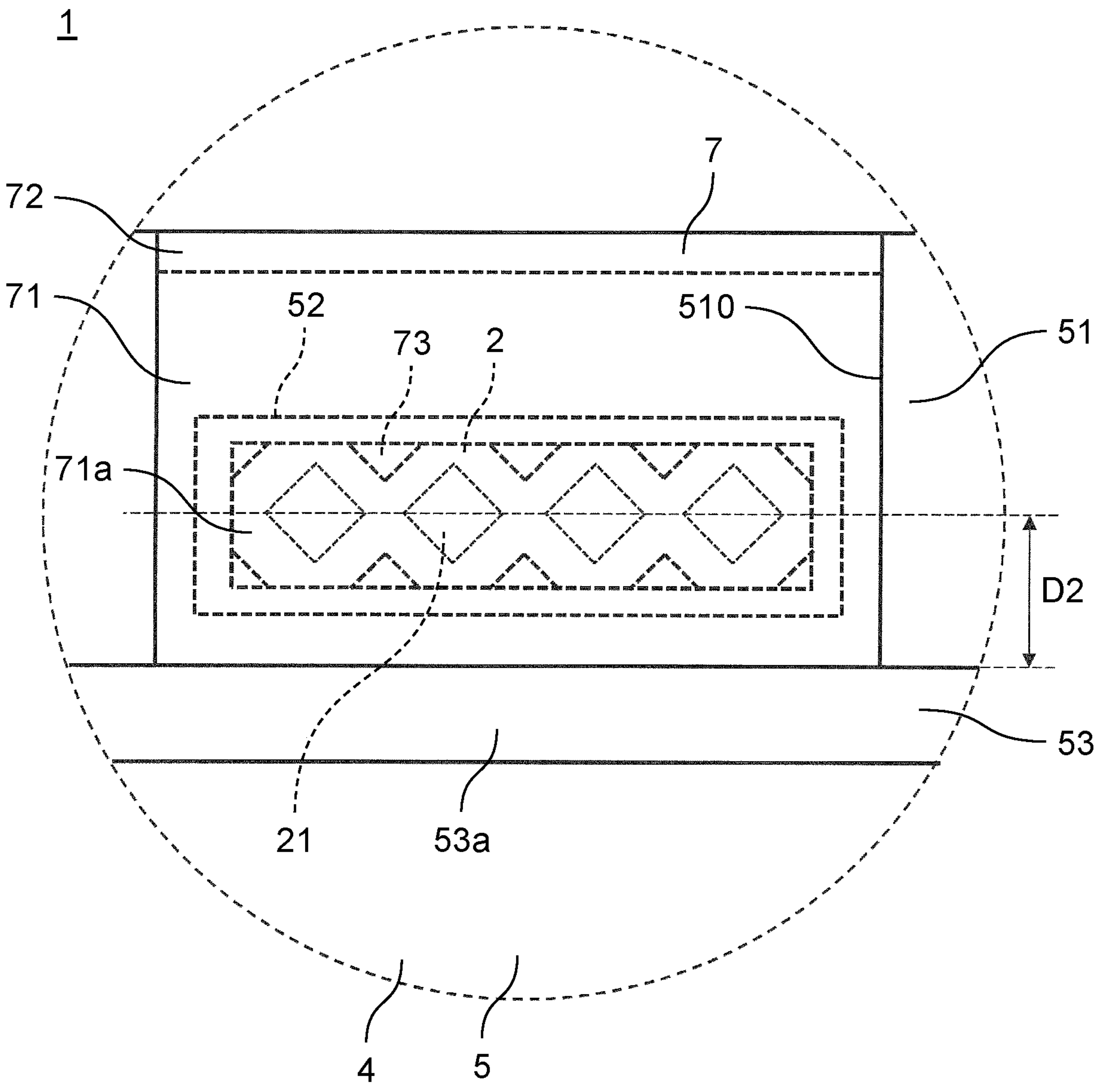
FIG. 4 is a diagram in which a radome is omitted in FIG. 3.

FIG. 3 is a partial perspective view in which a part of a portion indicated by P in FIG. 2 is cut out. FIG. 4 is a partial side view of the portion indicated by P in FIG. 2. Note that, in FIG. 3, antenna module 2 is illustrated in a simplified manner.

As illustrated in FIGS. 3 and 4, electronic device 1 includes radome 7 that covers antenna module 2. Recess portion 510 into which radome 7 is fitted is formed in predetermined surface 51. Recess 52 capable of accommodating antenna module 2 is formed in bottom surface **510*a* of recess portion 510. That is, recess 52 is provided in predetermined surface 51 of first housing 5**.

Figure 5:
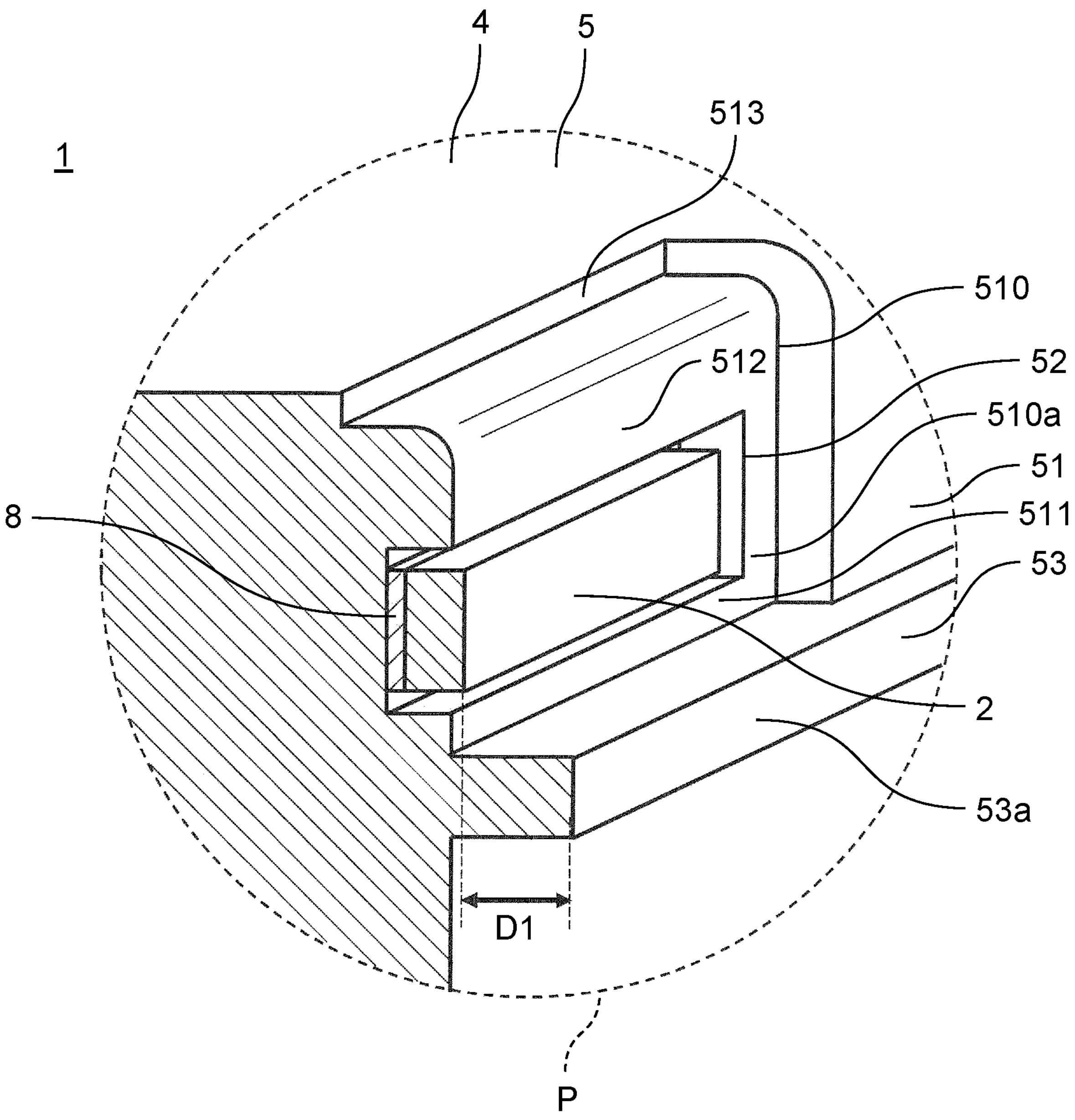
FIG. 5 is a cross-sectional view near an antenna module of the electronic device in FIG. 1.
Figure 6:
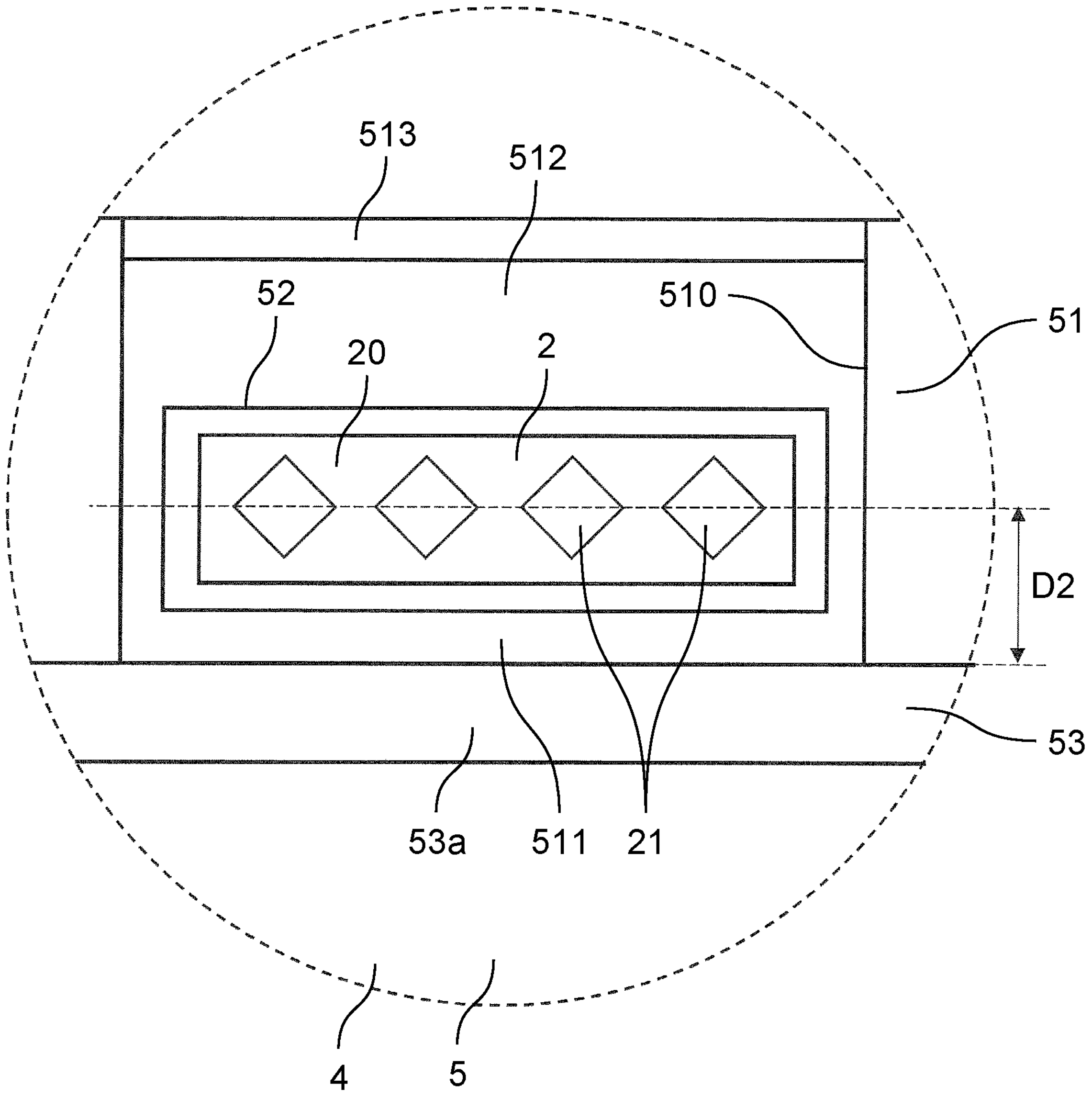
FIG. 6 is a side view near of the antenna module of the electronic device in FIG. 1.

FIG. 5 is a diagram in which radome 7 is omitted in FIG. 3. FIG. 6 is a diagram in which radome 7 is omitted in FIG. 4. Note that, in FIG. 5, antenna module 2 is illustrated in a simplified manner.

As illustrated in FIGS. 5 and 6, antenna module 2 has a rectangular plate shape. Antenna module 2 has a thickness direction (left-right direction in FIG. 5), a length direction (left-right direction in FIG. 6), and a width direction (up-down direction in FIG. 6). Antenna module 2 has antenna surface 20 on one surface in the thickness direction.

As illustrated in FIG. 6, antenna surface 20 has a plurality of antenna elements 21. Antenna element 21 is, for example, an electrode that is formed on antenna surface 20 and resonates at a predetermined communication frequency. In FIG. 6, the plurality of antenna elements 21 are lined up in a length direction of antenna surface 20. Consequently, antenna module 2 can be used as a phased array antenna. In the present exemplary embodiment, the length direction of antenna surface 20 is an array direction in which antenna elements 21 are lined up on antenna surface 20. A width direction of antenna surface 20 is a non-array direction in which antenna elements 21 are not lined up on antenna surface 20.

As illustrated in FIGS. 5 and 6, recess 52 has a substantially rectangular shape. A size of recess 52 is larger than a size of antenna module 2 as viewed from the thickness direction of antenna module 2. A length direction (left-right direction in FIG. 6) of recess 52 coincides with the length direction of predetermined surface 51. A width direction (up-down direction in FIG. 6) of recess 52 coincides with a width direction of predetermined surface 51, that is, the thickness direction of housing 4.

As illustrated in FIGS. 5 and 6, antenna module 2 is within recess 52 such that a surface direction of antenna surface 20 of antenna module 2 coincides with a surface direction of predetermined surface 51. Here, the surface direction means a direction perpendicular to the surface. That is, antenna module 2 is accommodated within recess 52 such that antenna surface 20 is parallel to predetermined surface 51. Antenna module 2 is within recess 52 such that antenna surface 20 is outside recess 52. That is, antenna surface 20 protrudes outward from recess 52. In the present exemplary embodiment, a center position of antenna surface 20 of antenna module 2 in the width direction coincides with a center position of recess 52 in the width direction. Antenna module 2 is connected to communication circuit 31 by an electric wire or the like by using an opening that connects an inside of recess 52 and an inside of first housing 5.

In antenna module 2, the plurality of antenna elements 21 are lined up in a row in the length direction of antenna surface 20. Communication circuit 31 can control directivity of antenna module 2 in a plane orthogonal to the width direction of antenna surface 20 by a beamforming technique. On the other hand, in antenna module 2, since only single antenna element 21 is present on antenna surface 20 in the width direction of antenna surface 20, the directivity cannot be controlled by the beamforming technique on a plane orthogonal to the length direction of antenna surface 20. Thus, in the plane orthogonal to the length direction of antenna surface 20, in single antenna module 2, a main radiation direction of antenna module 2 coincides with the surface direction of predetermined surface 51. In FIG. 1, dotted arrow A1 indicates the main radiation direction of antenna module 2 that coincides with the surface direction of predetermined surface 51.

In the present exemplary embodiment, electronic device 1 is a laptop computer. In the laptop computer, an antenna gain of antenna module 2 is desirably secured in an upper hemispherical region of 90° from the zenith.

Antenna module 2 is inclined upward with respect to first housing 5, and thus, the antenna gain can be secured in the upper hemispherical region with the main radiation direction of antenna module 2 directed upward. In FIG. 1, solid arrow A2 indicates the main radiation direction of antenna module 2 inclined upward with respect to the surface direction of predetermined surface 51. However, when antenna surface 20 of antenna module 2 is inclined with respect to predetermined surface 51 of first housing 5, a distance between antenna surface 20 and radome 7 becomes uneven. As a result, an influence on antenna characteristics of radome 7 increases, and thus, there is a possibility that the antenna characteristics deteriorate.

In the present exemplary embodiment, a structure for adjusting the main radiation direction of antenna module 2 is provided on predetermined surface 51 instead of inclining antenna module 2 with respect to first housing 5.

As illustrated in FIGS. 5 and 6, predetermined surface 51 includes first region 511 and second region 512 that are opposite to each other with respect to recess 52 in the width direction of antenna surface 20. In the present exemplary embodiment, first region 511 is a region on a bottom surface side (lower side in FIG. 6) of first housing 5 with respect to recess 52 on predetermined surface 51. Second region 512 is a region on an upper surface side (upper side in FIG. 6) of first housing 5 with respect to recess 52 on predetermined surface 51. First region 511 and second region 512 are flat.

First housing 5 has protrusion 53 in first region 511. That is, housing 4 has protrusion 53 in first region 511. Protrusion 53 has conductivity. Protrusion 53 is made of a conductive material such as a metal material. The metal material is, for example, magnesium.

In the present exemplary embodiment, protrusion 53 is formed integrally with first housing 5. As illustrated in FIG. 6, in the present exemplary embodiment, protrusion 53 extends over the entire length direction of antenna surface 20. Protrusion 53 has distal end 53*a*. Distal end 53*a* is a flat surface.

First housing 5 does not have a structure like protrusion 53 in second region 512. In the present exemplary embodiment, second region 512 includes an end (in the present exemplary embodiment, an upper end) of predetermined surface 51. Within recess portion 510, the end of predetermined surface 51 has stepped portion 513 recessed further in a direction opposite to the surface direction of antenna surface 20 than antenna surface 20. Stepped portion 513 extends over the entire length direction of antenna surface 20. As illustrated in FIGS. 5 and 6, both second region 512 and stepped portion 513 are flat, but second region 512 and stepped portion 513 are formed in an R shape.

Figure 7:
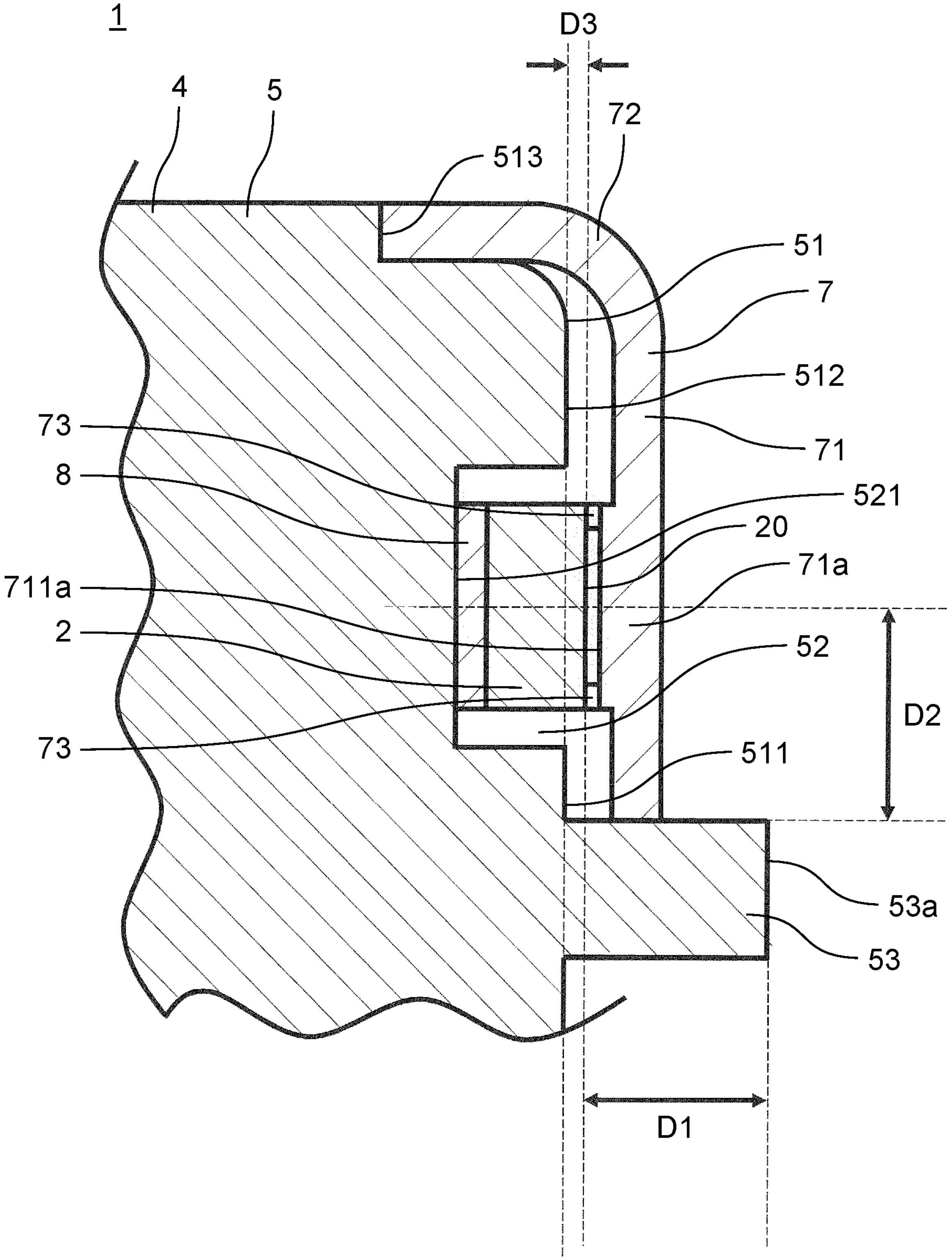
FIG. 7 is a diagram in which the radome is omitted in FIG. 6.

A structure near antenna module 2 of electronic device 1 will be described in more detail with reference to FIG. 7. FIG. 7 is a partial cross-sectional view near antenna module 2 of electronic device 1.

As illustrated in FIG. 7, distal end 53*a* of protrusion 53 protrudes further in the surface direction (right direction in FIG. 7) of antenna surface 20 than antenna surface 20. Distance D1 between distal end 53*a* of protrusion 53 and antenna surface 20 is from 0.15 times to 0.40 times inclusive of a wavelength corresponding to the predetermined communication frequency. More specifically, distance D1 is a distance between antenna surface 20 and distal end 53*a* in the surface direction of antenna surface 20. Distance D2 between a center of antenna surface 20 in the width direction and protrusion 53 is from 0.30 times to 0.8 times inclusive of the wavelength corresponding to the predetermined communication frequency. More specifically, distance D2 is a distance between the center of antenna surface 20 in the width direction and a side surface of protrusion 53 on antenna module 2 side in the width direction of antenna surface 20.

Second region 512 does not protrude further in the surface direction of antenna surface 20 than antenna surface 20. Unlike first region 511 where protrusion 53 is present, second region 512 does not protrude from antenna surface 20 in the surface direction of antenna surface 20. That is, second region 512 may be on the same plane as antenna surface 20 or may be recessed with respect to antenna surface 20. Radio waves from antenna module 2 easily pass through a portion of housing 4 near second region 512. Stepped portion 513 is present in second region 512. Stepped portion 513 can reduce a volume of housing 4 on second region 512 side from antenna module 2. Thus, the radio waves from antenna module 2 can easily pass through. Stepped portion 513 is on a side (left side in FIG. 7) opposite to predetermined surface 51 with respect to bottom surface 521 of recess 52. Distance D3 from antenna surface 20 to predetermined surface 51 in the surface direction of antenna surface 20 is, for example, from 0.03 times to 0.05 times inclusive of the wavelength corresponding to the predetermined communication frequency. Thus, the radio waves from antenna module 2 can further easily pass through.

As described above, in electronic device 1, as illustrated in FIG. 7, first region 511 has protrusion 53 having conductivity of which distal end 53*a* protrudes further in the surface direction of antenna surface 20 than antenna surface 20, and second region 512 does not protrude further in the surface direction of antenna surface 20 from antenna surface 20. Thus, among the radio waves radiated from antenna surface 20 of antenna module 2, a part of the radio waves traveling toward first region 511 is reflected by protrusion 53 and travels toward second region 512. On the other hand, among the radio waves radiated from antenna surface 20 of antenna module 2, a part of the radio waves traveling toward second region 512 travels as it is without being disturbed. A radiation pattern of antenna module 2 decreases on first region 511 side and increases on second region 512 side. Consequently, the main radiation direction of antenna module 2 is inclined toward second region 512 without inclining antenna module 2 itself. Accordingly, according to electronic device 1, the main radiation direction of antenna module 2 can be inclined with respect to housing 4 without inclining antenna module 2 with respect to housing 4.

As illustrated in FIGS. 3, 4, and 7, radome 7 is attached to first housing 5. Radome 7 protects antenna module 2. Radome 7 is made of a dielectric such as a resin material to transmit the radio waves from antenna module 2 or the radio waves to antenna module 2. Radome 7 includes first portion 71, second portion 72, and spacer 73.

First portion 71 covers antenna surface 20. First portion 71 has a rectangular plate shape having a size covering antenna surface 20. As illustrated in FIGS. 4 and 7, first portion 71 includes facing portion 71*a*. Facing portion 71*a* has facing region 711*a* facing antenna surface 20 in parallel.

As illustrated in FIG. 7, facing portion 71*a* protrudes toward antenna surface 20. As viewed from the surface direction of antenna surface 20, a shape of antenna surface 20 is equal to a shape of facing portion 71*a*. A surface of facing portion 71*a* on antenna surface 20 side is facing region 711*a* facing antenna surface 20 in parallel. Facing portion 71*a* is line-symmetric with respect to a line passing through the center of antenna surface 20 in the width direction. A thickness of facing portion 71*a* is uniform. Both surfaces of facing portion 71*a* in the thickness direction are flat surfaces. According to facing portion 71*a*, it is possible to reduce a possibility that radiation characteristics of antenna module 2 are disturbed by facing portion 71*a* and the radiation becomes strong or weak in an unintended direction. As a result, a gain of antenna module 2 in a front direction (a direction of antenna surface 20) can be improved.

Second portion 72 extends from first portion 71 to abut on stepped portion 513. More specifically, second portion 72 extends from one end (an upper end in FIG. 7) of first portion 71. Second portion 72 is formed continuously and integrally with first portion 71. In second portion 72, a connection portion with first portion 71 has an R shape. Second portion 72 covers a gap between one end of first portion 71 and stepped portion 513. A dimension of second portion 72 in the surface direction of antenna surface 20 is set such that first portion 71 does not come into contact with first region 511 and second region 512.

Antenna module 2 is accommodated in recess 52 to cause antenna surface 20 to protrude from recess 52. In a case where radome 7 is attached to housing 4, antenna surface 20 of antenna module 2 faces facing region 711*a* of radome 7. A distance between facing region 711*a* and antenna surface 20 is set within a predetermined distance range in which a decrease in antenna gain due to reflection of the radio waves at radome 7 can be suppressed. The predetermined distance range is, for example, within a range from 1/50 to 1/30 inclusive of the wavelength corresponding to the predetermined communication frequency of antenna module 2.

Spacer 73 is used to set the distance between facing region 711*a* and antenna surface 20 within the predetermined distance range. As illustrated in FIG. 7, spacer 73 is between facing region 711*a* and antenna surface 20, and maintains the distance between facing region 711*a* and antenna surface 20 within the predetermined distance range. In the present exemplary embodiment, spacer 73 is formed in facing region 711*a*. Spacer 73 is formed continuously and integrally with first portion 71 and is a dielectric. A height of spacer 73 is set such that the distance between facing region 711*a* and antenna surface 20 is within the predetermined distance range in a state where antenna surface 20 abuts on spacer 73.

As illustrated in FIG. 4, spacer 73 is disposed not to face antenna elements 21 of antenna module 2 (in the thickness direction of antenna module 2). Further, a distance between spacer 73 and antenna element 21 within a plane parallel to antenna surface 20 is set such that the influence on the antenna characteristics such as the antenna gain and the radiation directivity due to the provision of spacer 73 can be reduced. As an example, the distance between spacer 73 and antenna element 21 within the plane parallel to antenna surface 20 is within a range from 1/5 to 1/8 inclusive of the wavelength corresponding to the predetermined communication frequency.

As illustrated in FIGS. 3, 5, and 7, antenna module 2 is accommodated in recess 52 of predetermined surface 51 of housing 4, and elastic member 8 is disposed between antenna module 2 and bottom surface 521 of recess 52. A depth of recess 52 is smaller than a thickness of antenna module 2 and a thickness of elastic member 8. Thus, antenna module 2 is accommodated in recess 52 such that antenna surface 20 protrudes from recess 52.

As described above, electronic device 1 includes elastic member 8 disposed between bottom surface 521 of recess 52 and antenna module 2. Elastic member 8 is used to position antenna module 2 with respect to radome 7 in the thickness direction of antenna module 2. As illustrated in FIG. 7, elastic member 8 is disposed between antenna module 2 and bottom surface 521 of recess 52. More specifically, elastic member 8 is disposed between antenna module 2 and bottom surface 521 of recess 52 in a compressed state in the thickness direction of antenna module 2. Elastic member 8 has elasticity to the extent that the elastic member can withstand a weight of antenna module 2 and can press antenna module 2 against radome 7. According to this configuration, elastic member 8 uniformly presses antenna module 2 against facing region 711*a* of radome 7. Thus, even though shape errors or thermal expansion and contraction of antenna module 2, housing 4, radome 7, and the like occur, antenna module 2 can be positioned at a position predetermined for radome 7. Accordingly, variations in antenna performance due to variations in distance between antenna module 2 and radome 7 can be reduced.

Examples of materials of elastic member 8 include a cushion material and a heat dissipation rubber material. The cushion material includes foamed polyurethane, foamed polyethylene, ethylene propylene rubber, and the like. The heat dissipation rubber material includes silicone, acryl, and the like. In the exemplary embodiment, elastic member 8 is made of the heat dissipation rubber material. Thus, elastic member 8 has thermal conductivity. Elastic member 8 can transfer heat generated in antenna module 2 to housing 4, and can improve heat dissipation of antenna module 2.

[1.2 Evaluation]

Hereinafter, results of evaluation of advantages of the configuration of electronic device 1 will be described. The antenna radiation pattern of electronic device 1 was evaluated by using electronic device 1 of the present exemplary embodiment and an electronic device of a comparative example. The electronic device of the comparative example is different from electronic device 1 of the above exemplary embodiment in that the electronic device of the comparative example does not include protrusion 53.

Figure 8:
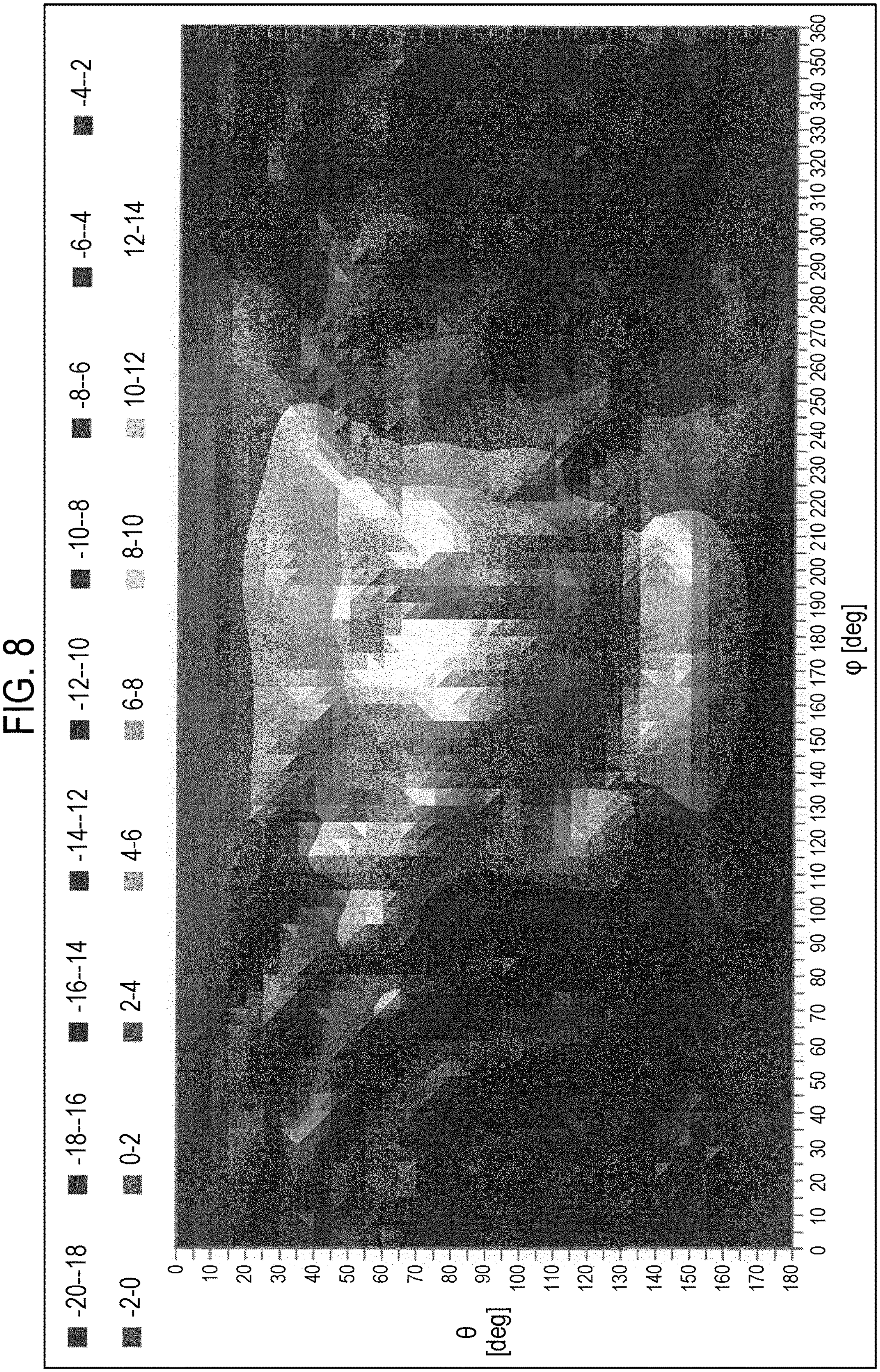
FIG. 8 is a heat map of antenna gains of the electronic device in FIG. 1.
Figure 9:
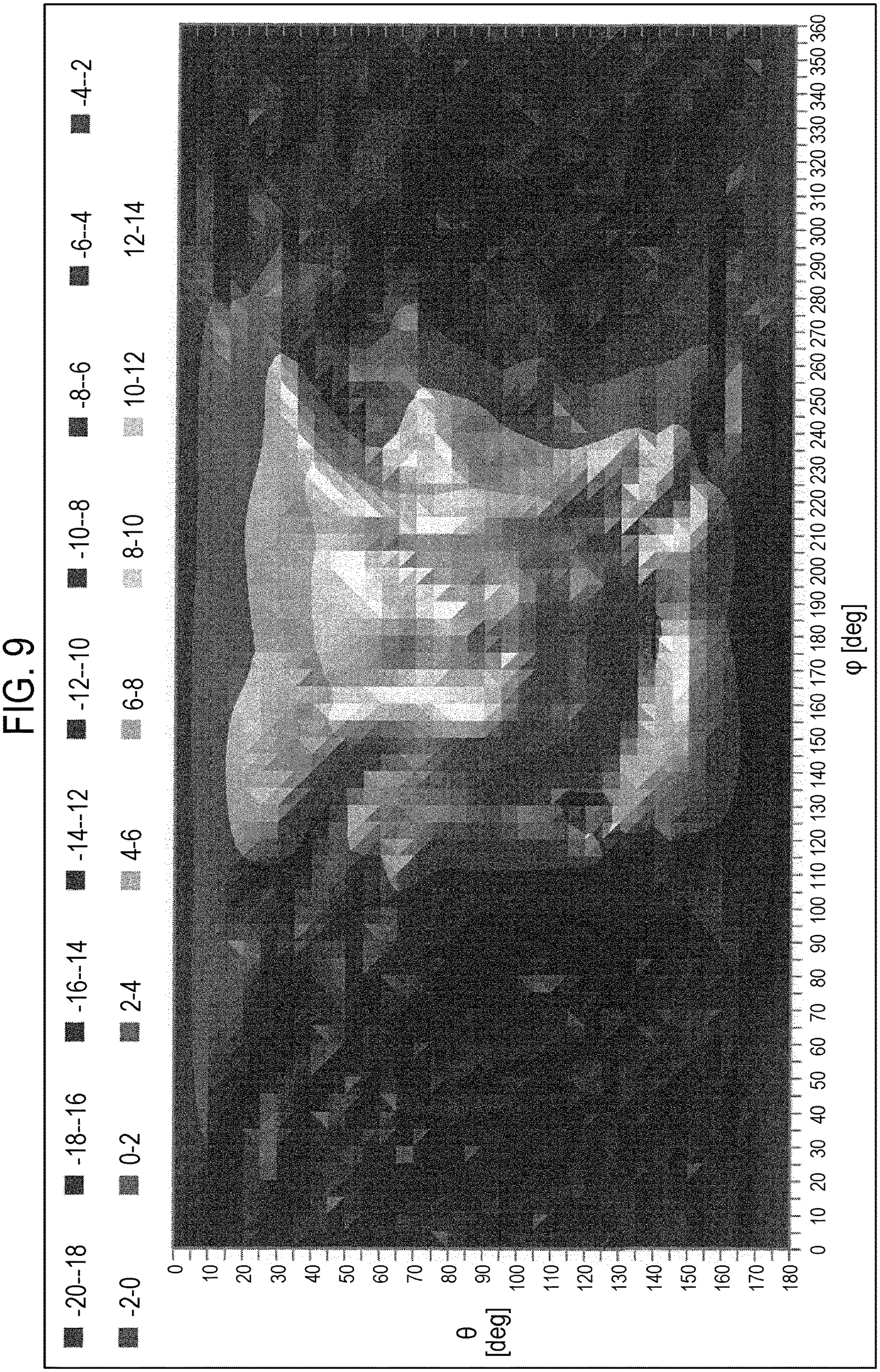
FIG. 9 is a heat map of antenna gains of the electronic device in FIG. 1.
Figure 10:
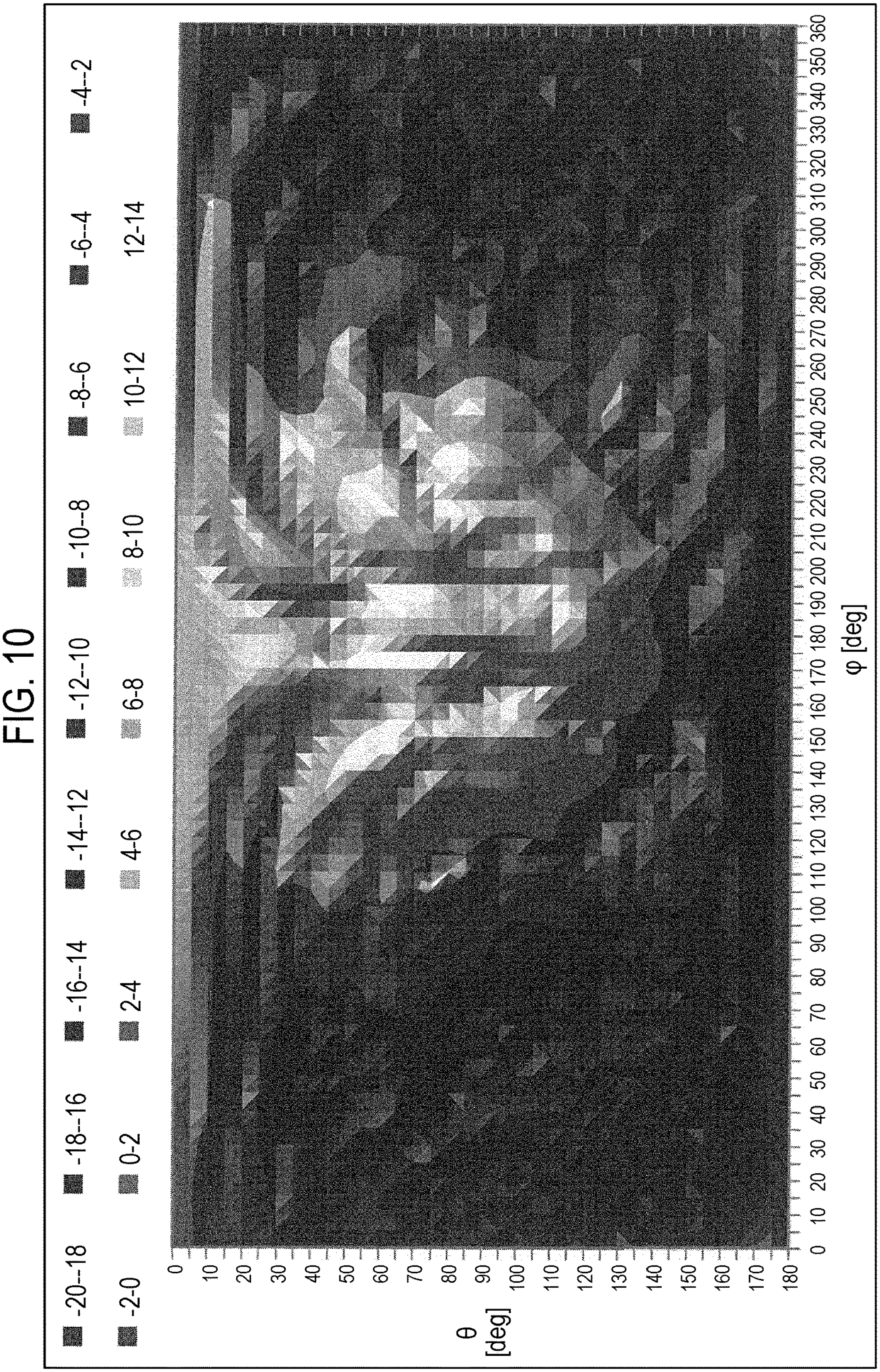
FIG. 10 is a heat map of antenna gains of the electronic device in FIG. 1.
Figure 11:
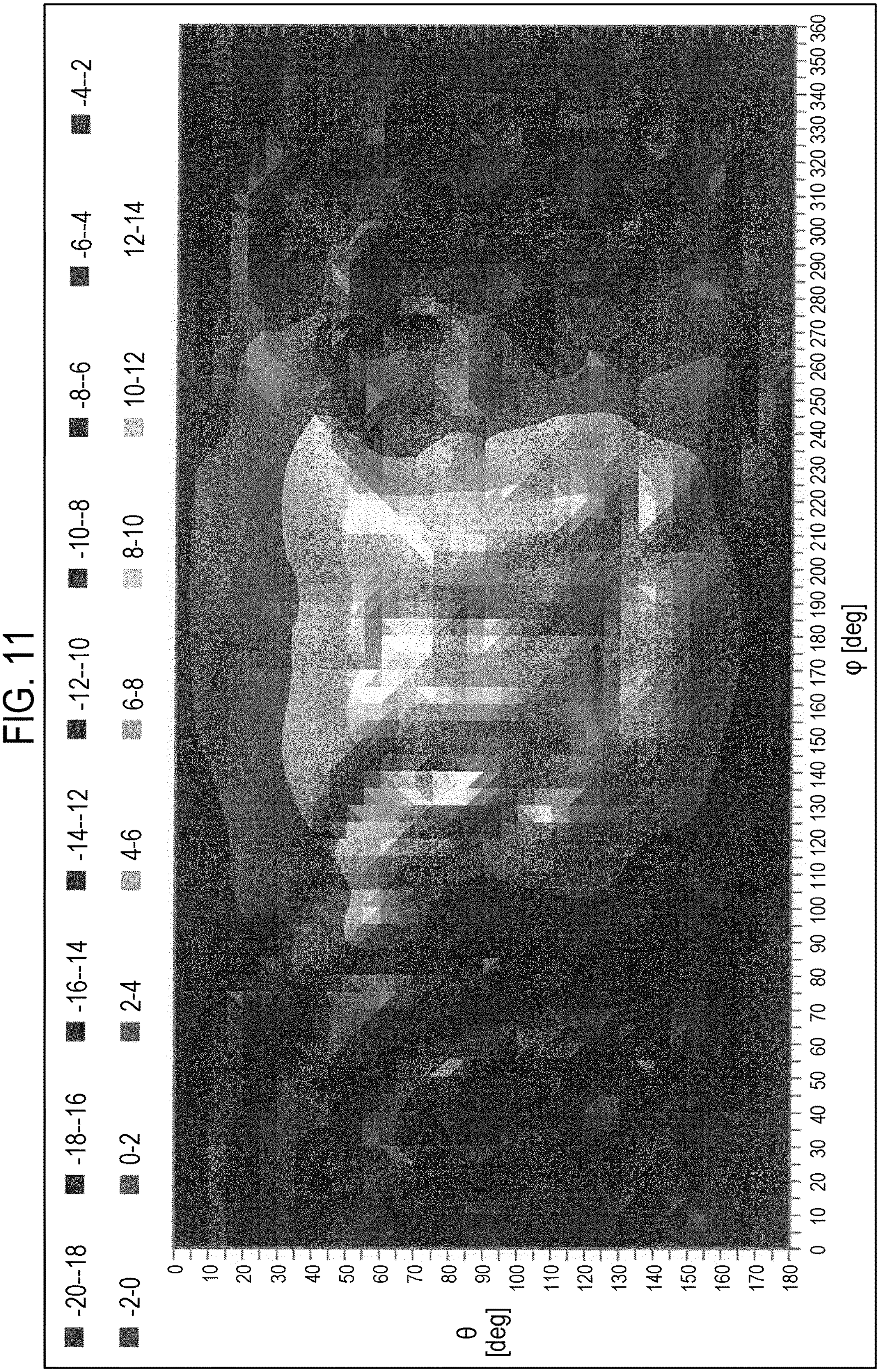
FIG. 11 is a heat map of antenna gains of an electronic device of a comparative example.
Figure 12:
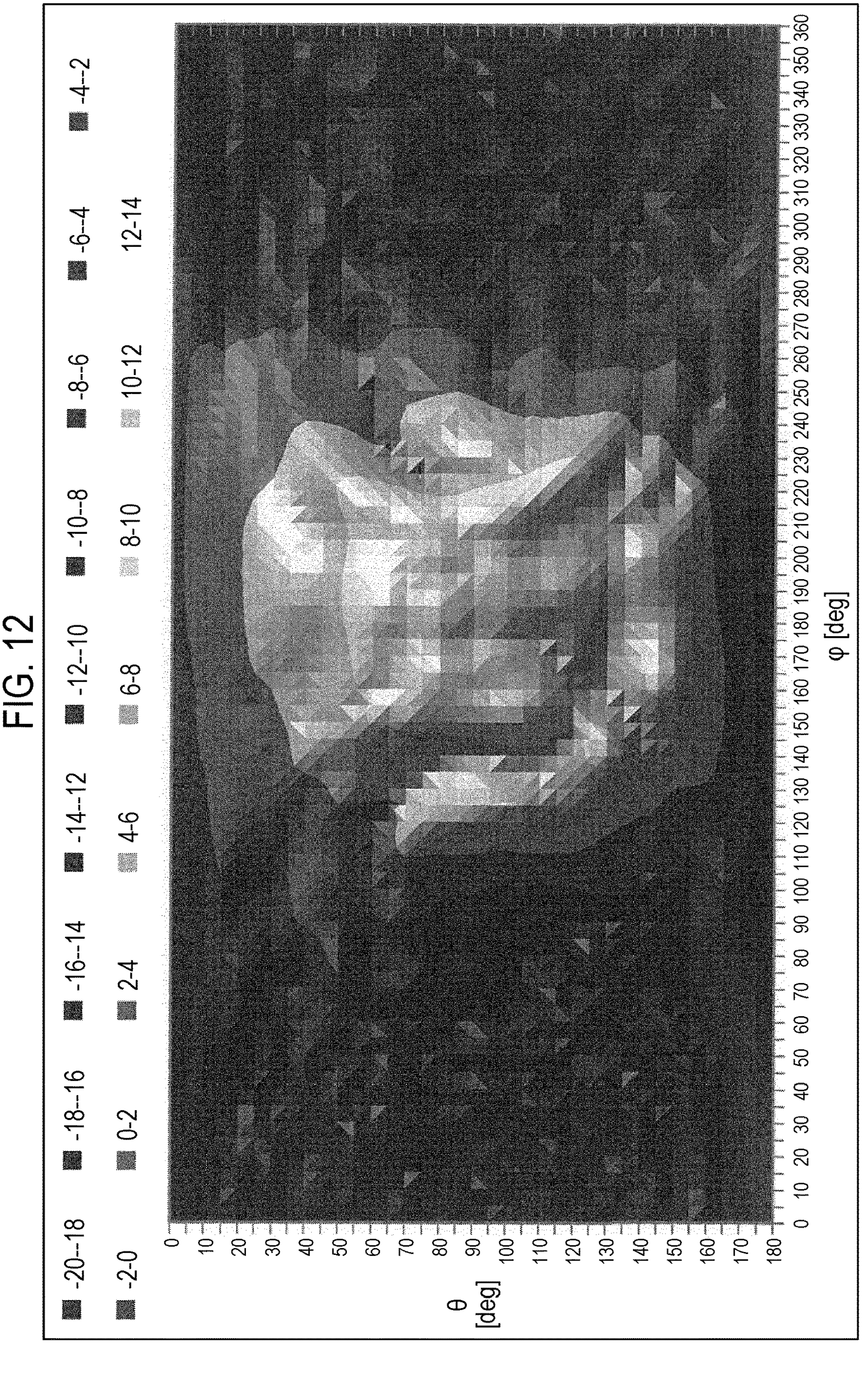
FIG. 12 is a heat map of antenna gains of the electronic device of the comparative example.
Figure 13:
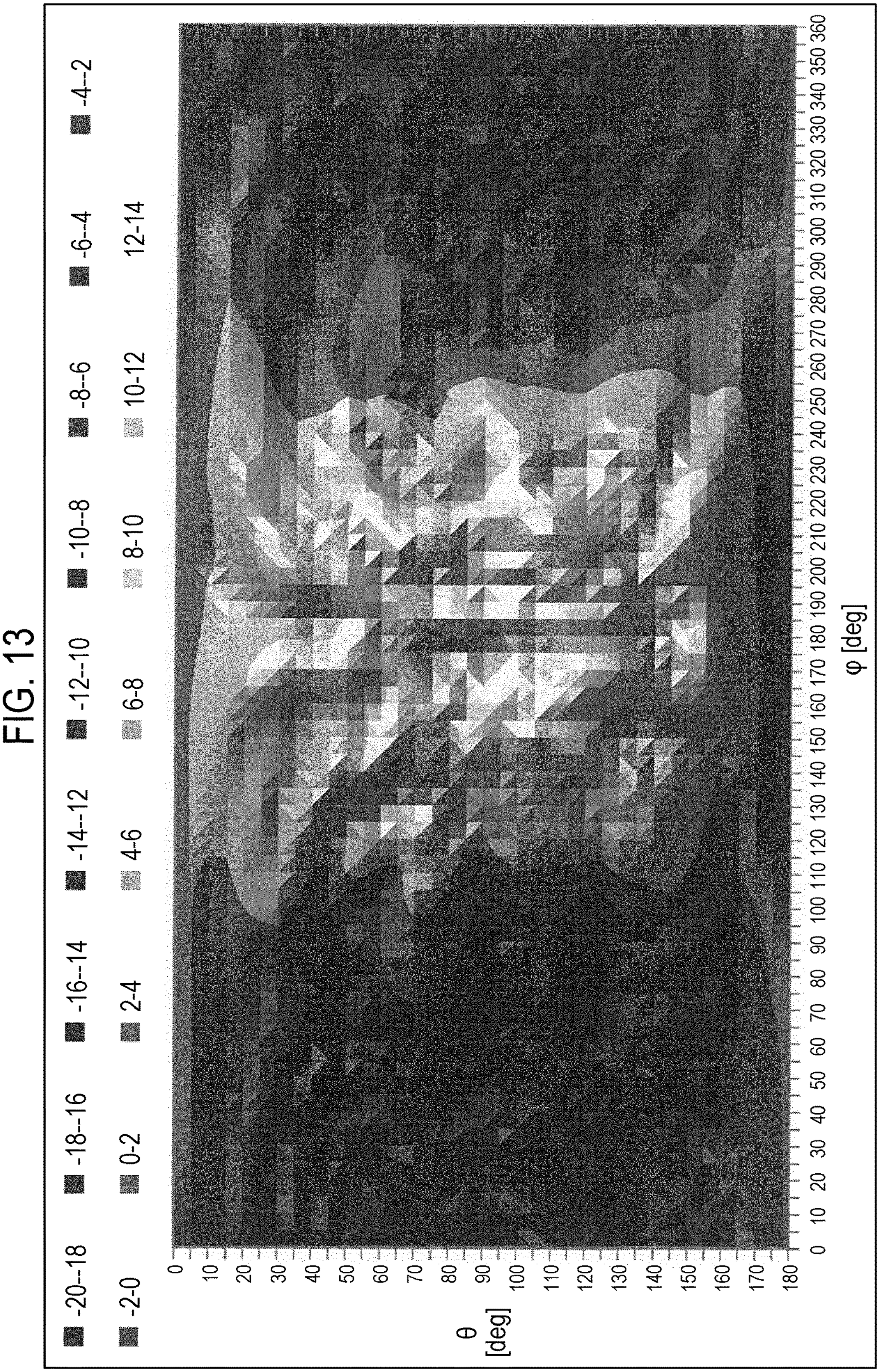
FIG. 13 is a heat map of antenna gains of the electronic device of the comparative example.

FIGS. 8 to 10 are heat maps of antenna gains of electronic device 1. FIGS. 11 to 13 are heat maps of antenna gains of the electronic device of the comparative example. In FIGS. 8 to 13, φ is an angle around a rotation axis passing through a center of antenna module 2 in the length direction and the thickness direction and extending in the width direction of antenna module 2. θ is an angle around a rotation axis passing through a center of antenna module 2 in the width direction and the thickness direction and extending in the length direction of antenna module 2. The surface direction of antenna surface 20 is a direction in which φ is 180° and θ is 90°.

FIGS. 8 and 11 illustrate results of simulation performed with the predetermined communication frequency set to 25.875 GHz corresponding to the bandwidth number n258. FIGS. 9 and 12 illustrate results of simulation performed with the predetermined communication frequency set to 27.925 GHz corresponding to the bandwidth number n261. FIGS. 10 and 13 illustrate results of simulation performed with the predetermined communication frequency set to 38.500 GHz corresponding to the bandwidth number n260.

From the comparison between FIGS. 8 and 11, it can be seen that, in electronic device 1, a peak of a distribution of the gains of the antenna transitions in a direction in which θ decreases, as compared with the electronic device of the comparative example. From the comparison between FIGS. 9 and 12, it can be seen that, in electronic device 1, a peak of the distribution of the gains of the antenna transitions in a direction in which θ decreases, as compared with the electronic device of the comparative example. From the comparison between FIGS. 10 and 13, it can be seen that, in electronic device 1, a peak of the distribution of the gains of the antenna transitions in a direction in which θ decreases, as compared with the electronic device of the comparative example. In particular, the peak of the distribution of the gains of the antenna generally transitions such that θ decreases by about 15°.

Accordingly, according to electronic device 1, it has been confirmed that the main radiation direction of antenna module 2 can be inclined with respect to housing 4 without inclining antenna module 2 with respect to housing 4. In particular, in electronic device 1 of the present exemplary embodiment, a radiation pattern in the non-array direction that cannot be handled by directivity control originally in antenna module 2 is changed, and thus, both a degree of freedom of the disposition of antenna module 2 in the laptop computer and the antenna performance can be achieved.

[1-3. Effects and the Like]

Electronic device 1 described above includes antenna module 2 for performing communication at the predetermined communication frequency, and housing 4 having predetermined surface 51 having recess 52 capable of accommodating antenna module 2. Antenna module 2 is within recess 52 such that the surface direction of antenna surface 20 of antenna module 2 coincides with the surface direction of predetermined surface 51. Predetermined surface 51 includes first region 511 and second region 512 that are opposite to each other with respect to recess 52 in the width direction of antenna surface 20. Housing 4 has protrusion 53 having conductivity in first region 511. Distal end 53*a* of protrusion 53 protrudes further in the surface direction of antenna surface 20 than antenna surface 20. Second region 512 does not protrude further in the surface direction of antenna surface 20 than antenna surface 20. With this configuration, the main radiation direction of antenna module 2 can be inclined with respect to housing 4 without inclining antenna module 2 with respect to housing 4.

In electronic device 1, distance D1 in the surface direction of antenna surface 20 between distal end 53*a* of protrusion 53 and antenna surface 20 is from 0.15 times to 0.40 times inclusive of the wavelength corresponding to the predetermined communication frequency. With this configuration, the main radiation direction of antenna module 2 can be inclined with respect to housing 4 without inclining antenna module 2 with respect to housing 4.

In electronic device 1, distance D2 along antenna surface 20 between the center of antenna surface 20 in the width direction and protrusion 53 is from 0.30 times to 0.8 times inclusive of the wavelength corresponding to the predetermined communication frequency. With this configuration, the main radiation direction of antenna module 2 can be inclined with respect to housing 4 without inclining antenna module 2 with respect to housing 4.

In electronic device 1, protrusion 53 extends over the entire length direction of antenna surface 20. With this configuration, the main radiation direction of antenna module 2 can be inclined with respect to housing 4 without inclining antenna module 2 with respect to housing 4.

In electronic device 1, second region 512 includes the end of predetermined surface 51. The end of predetermined surface 51 has stepped portion 513 recessed further in the direction opposite to the surface direction of antenna surface 20 than antenna surface 20. With this configuration, the main radiation direction of antenna module 2 can be inclined with respect to housing 4 without inclining antenna module 2 with respect to housing 4.

In electronic device 1, stepped portion 513 extends over the entire length direction of antenna surface 20. With this configuration, the main radiation direction of antenna module 2 can be inclined with respect to housing 4 without inclining antenna module 2 with respect to housing 4.

In electronic device 1, stepped portion 513 is opposite to predetermined surface 51 with respect to the bottom surface 521 of the recess 52. With this configuration, the main radiation direction of antenna module 2 can be inclined with respect to housing 4 without inclining antenna module 2 with respect to housing 4.

In electronic device 1, electronic device 1 further includes radome 7 being the dielectric. Radome 7 includes first portion 71 covering antenna surface 20 and second portion 72 extending from first portion 71 to abut on stepped portion 513. With this configuration, the main radiation direction of antenna module 2 can be inclined with respect to housing 4 without inclining antenna module 2 with respect to housing 4.

In electronic device 1, first portion 71 includes facing portion 71*a* having facing region 711*a* facing antenna surface 20 in parallel. A thickness of facing portion 71*a* is uniform. This configuration can improve the gain in the front direction of antenna module 2 (the surface direction of antenna surface 20).

In electronic device 1, antenna module 2 includes the plurality of antenna elements 21. The plurality of antenna elements 21 are lined up in the row in the length direction of antenna surface 20. With this configuration, the directivity of antenna module 2 can be controlled in the plane orthogonal to the width direction of antenna surface 20.

In electronic device 1, antenna module 2 is within recess 52 such that antenna surface 20 is outside recess 52. This configuration can improve the gain in the front direction of antenna module 2 (the surface direction of antenna surface 20).

In electronic device 1, distance D3 from antenna surface 20 to predetermined surface 51 in the surface direction of antenna surface 20 is from 0.03 times to 0.05 times inclusive of the wavelength corresponding to the predetermined communication frequency. Due to this configuration, the radio waves from antenna module 2 can further easily pass through.

In electronic device 1, housing 4 has conductivity. This configuration can improve the gain in the front direction of antenna module 2 (the surface direction of antenna surface 20).

In electronic device 1, predetermined surface 51 is the side surface of housing 4. The width direction of antenna surface 20 coincides with the thickness direction of housing 4. This configuration can reduce a possibility of degradation of the antenna performance due to the hand of the user touching antenna module 2 or covering antenna module 2.

In electronic device 1, the predetermined communication frequency is included in the frequency bandwidth of 24.250 GHz to 52.600 GHz, and this configuration can improve a communication speed by antenna module 2.

2. Modification Example

The exemplary embodiment of the present disclosure is not limited to the above exemplary embodiment. The above exemplary embodiment can be variously modified in accordance with design and the like as long as an object of the present disclosure can be achieved. Hereinafter, a modification example of the above exemplary embodiment will be listed. The modification example to be described below can be applied in appropriate combination.

Electronic device 1 is not limited to the laptop computer of the above exemplary embodiment. Electronic device 1 may be a device having a communication function such as a terminal device and a server. Examples of the terminal device include a personal computer (desktop computer or laptop computer) and a mobile terminal (smartphone, a tablet terminal, wearable terminal, or the like).

In the modification example, the number of antenna elements 21 lined up in the row in antenna module 2 may be four or more. In the modification example, antenna module 2 is not limited to a phased array antenna. In antenna module 2, the plurality of antenna elements 21 may be disposed in a matrix of 2×2, 2×4, or the like on antenna surface 20. That is, the plurality of antenna elements 21 may include antenna elements 21 lined up in the row in the width direction of antenna surface 20. That is, protrusion 53 may also be provided in a direction in which antenna elements 21 are lined up, and may not be provided only in a direction in which antenna elements 21 are not lined up. Antenna module 2 may be a multiband antenna capable of performing communication in different frequency bandwidths. The shape and number of antenna elements 21 are also not particularly limited. The predetermined communication frequency is not limited to the frequency bandwidth of 24.250 GHz to 52.600 GHz and may be selected from a desired frequency bandwidth.

In the modification example, predetermined surface 51 is not necessarily the right side surface of housing 4, and may be any of a left side surface, an upper surface, a bottom surface, a front surface, and a rear surface of housing 4. Predetermined surface 51 may be a desired surface of housing 4.

In the modification example, predetermined surface 51 may not have recess portion 510.

In the modification example, the shape of recess 52 is not limited to the shape in the above exemplary embodiment and may be appropriately set in accordance with the shape of antenna module 2. Note that, housing 4 may have a plurality of positioning protrusions for positioning antenna module 2 at a predetermined position within recess 52 by abutting on antenna module 2.

In the modification example, the shape of protrusion 53 is not limited to the shape in the above exemplary embodiment. Protrusion 53 may be able to reflect the radio waves from antenna module 2. For example, a dimension of protrusion 53 in the width direction of antenna surface 20 may not be uniform. Distal end 53*a* of protrusion 53 may not be a flat surface. Protrusion 53 may not extend over the entire length direction of antenna surface 20, and may have a length capable of sufficiently reflecting the radio waves from antenna module 2. Protrusion 53 is not necessarily formed continuously and integrally with first housing 5. Protrusion 53 may be a part of the structure provided in housing 4 of electronic device 1. Examples of the structure provided in housing 4 of electronic device 1 include a part of a connector, a wall of a waterproof structure, a part of a handle, and a part of a design structure.

In the modification example, a region from second region 512 to stepped portion 513 may not have the R shape but may have a shape with a corner such as a right angle shape. The shape from second region 512 to stepped portion 513 may be appropriately set in accordance with the shape from first portion 71 to second portion 72 of radome 7. The shape of stepped portion 513 is not limited to the shape in the above exemplary embodiment. Stepped portion 513 may not extend over entire antenna surface 20 in the length direction, and may have a length that does not interfere with the radio waves from antenna module 2. Stepped portion 513 is not essential.

In the modification example, the shape of radome 7 is not limited to the shape in the above exemplary embodiment and may be appropriately set in accordance with the shape of antenna module 2. In changing the shape of radome 7, the thickness of facing portion 71*a* is preferably uniform. Note that, facing portion 71*a* is not necessarily required to protrude toward antenna surface 20. Spacer 73 may be able to set the distance between antenna surface 20 and facing region 711*a* within the predetermined distance range by abutting on antenna module 2, and the shape and number of spacers 73 are not particularly limited. Elastic member 8 is not essential.

In the modification example, elastic member 8 may include a main body having elasticity and a conductive layer formed on an outer surface of the main body. The conductive layer connects a ground surface of antenna module 2 to housing 4. Thus, housing 4 can be used as a ground of antenna module 2. An influence of sensitivity suppression due to unnecessary radiation from antenna module 2 can be reduced. As long as the heat dissipation of antenna module 2 is sufficient, elastic member 8 may not necessarily have thermal conductivity. Elastic member 8 is not essential.

3. Aspects

As is apparent from the above exemplary embodiment and modification example, the present disclosure includes the following aspects. Hereinafter, reference marks are given in parentheses only to clarify the correspondence with the exemplary embodiment.

A first aspect is electronic device (1) including antenna module (2) that performs communication at a predetermined communication frequency, and housing (4) that has predetermined surface (51) having recess (52) capable of accommodating antenna module (2). Antenna module (2) is within recess (52) such that a surface direction of antenna surface (20) of antenna module (2) coincides with a surface direction of predetermined surface (51). Predetermined surface (51) includes first region (511) and second region (512) that are opposite to each other with respect to recess (52) in a width direction of antenna surface (20). Housing (4) has protrusion (53) having conductivity in first region (511). Distal end (53*a*) of protrusion (53) protrudes further in the surface direction of antenna surface (20) than antenna surface (20). Second region (512) does not protrude further in the surface direction of antenna surface (20) than antenna surface (20). In this aspect, the main radiation direction of antenna module (2) can be inclined with respect to housing (4) without inclining antenna module (2) with respect to housing (4).

A second aspect is electronic device (1) based on the first aspect. In the second aspect, distance (D1) between distal end (53*a*) of protrusion (53) and antenna surface (20) is from 0.15 times to 0.40 times inclusive of a wavelength corresponding to the predetermined communication frequency. In this aspect, the main radiation direction of antenna module (2) can be inclined with respect to housing (4) without inclining antenna module (2) with respect to housing (4).

A third aspect is electronic device (1) based on the first or second aspect. In the third aspect, distance (D2) between a center of antenna surface (20) in the width direction and protrusion (53) is from 0.30 times to 0.8 times inclusive of a wavelength corresponding to the predetermined communication frequency. In this aspect, the main radiation direction of antenna module (2) can be inclined with respect to housing (4) without inclining antenna module (2) with respect to housing (4).

A fourth aspect is electronic device (1) based on any one of the first to third aspects. In the fourth aspect, protrusion (53) extends over the entire length direction of antenna surface (20). In this aspect, the main radiation direction of antenna module (2) can be inclined with respect to housing (4) without inclining antenna module (2) with respect to housing (4).

A fifth aspect is electronic device (1) based on any one of the first to fourth aspects. In the fifth aspect, second region (512) includes an end of predetermined surface (51). The end of predetermined surface (51) has stepped portion (513) recessed further in a direction opposite to the surface direction of antenna surface (20) than antenna surface (20). In this aspect, the main radiation direction of antenna module (2) can be inclined with respect to housing (4) without inclining antenna module (2) with respect to housing (4).

A sixth aspect is electronic device (1) based on the fifth aspect. In the sixth aspect, stepped portion (513) extends over the entire length direction of antenna surface (20). In this aspect, the main radiation direction of antenna module (2) can be inclined with respect to housing (4) without inclining antenna module (2) with respect to housing (4).

A seventh aspect is electronic device (1) based on the fifth or sixth aspect. In the seventh aspect, stepped portion (513) is opposite to predetermined surface (51) with respect to bottom surface (521) of recess (52). In this aspect, the main radiation direction of antenna module (2) can be inclined with respect to housing (4) without inclining antenna module (2) with respect to housing (4).

An eighth aspect is electronic device (1) based on any one of the fifth to seventh aspects. In the eighth aspect, electronic device (1) further includes radome (7) being a dielectric. Radome (7) includes first portion (71) that covers antenna surface (20), and second portion (72) that extends from first portion (71) to abut on stepped portion (513). In this aspect, the main radiation direction of antenna module (2) can be inclined with respect to housing (4) without inclining antenna module (2) with respect to housing (4).

A ninth aspect is electronic device (1) based on the eighth aspect. In the ninth aspect, first portion (71) includes facing portion (71*a*) having facing region (711*a*) facing antenna surface (20) in parallel. A thickness of facing portion (71*a*) is uniform. This aspect can improve the gain in the front direction (the surface direction of antenna surface (20)) of antenna module (2).

A tenth aspect is electronic device (1) based on any one of the first to ninth aspects. In the tenth aspect, antenna module (2) includes a plurality of antenna elements (21). The plurality of antenna elements (21) are lined up in a row in a length direction of antenna surface (20). In this aspect, the directivity of antenna module (2) can be controlled in a plane orthogonal to the width direction of antenna surface (20).

An eleventh aspect is electronic device (1) based on any one of the first to tenth aspects. In the eleventh aspect, antenna module (2) is within recess (52) such that antenna surface (20) is outside recess (52). This aspect can improve the gain in the front direction (the surface direction of antenna surface (20)) of antenna module (2).

A twelfth aspect is electronic device (1) based on the eleventh aspect. In the twelfth aspect, distance (D3) from antenna surface (20) to predetermined surface (51) in the surface direction of antenna surface (20) is from 0.03 times to 0.05 times inclusive of a wavelength corresponding to the predetermined communication frequency. This aspect can further facilitate the radio waves from antenna module (2).

A thirteenth aspect is electronic device (1) based on any one of the first to twelfth aspects. In the thirteenth aspect, housing (4) has conductivity. This aspect can improve the gain in the front direction (the surface direction of antenna surface (20)) of antenna module (2).

A fourteenth aspect is electronic device (1) based on any one of the first to thirteenth aspects. In the fourteenth aspect, predetermined surface (51) is a side surface of housing (4). The width direction of antenna surface (20) coincides with a thickness direction of housing (4). This aspect can reduce a possibility that antenna performance degrades due to the hand of the user touching antenna module (2) or covering antenna module (2).

A fifteenth aspect is electronic device (1) based on any one of the first to fourteenth aspects. In the fifteenth aspect, the predetermined communication frequency is included in a frequency bandwidth of 24.250 GHz to 52.600 GHz. This aspect can improve a communication speed by antenna module (2).

The present disclosure relates to an electronic device. Specifically, the present disclosure is applicable to an electronic device that performs wireless communication.

What is claimed is:

1. An electronic device comprising:

an antenna module that performs communication at a predetermined communication frequency; and a housing that includes a predetermined surface and a recess provided in the predetermined surface, wherein the antenna module is accommodated within the recess, a surface direction perpendicular to an antenna surface of the antenna module coinciding with a surface direction perpendicular to the predetermined surface, the predetermined surface includes a first region and a second region that are opposite to each other with respect to the recess in a width direction of the antenna surface, the housing includes a protrusion having conductivity in the first region, a distal end of the protrusion protrudes further in the surface direction perpendicular to the antenna surface than the antenna surface, and the second region does not protrude further in the surface direction perpendicular to the antenna surface than the antenna surface.

2. The electronic device according to claim 1, wherein a distance in the surface direction of the antenna surface between the distal end of the protrusion and the antenna surface is from 0.15 times to 0.40 times inclusive of a wavelength corresponding to the predetermined communication frequency.

3. The electronic device according to claim 1, wherein a distance along the antenna surface between a center of the antenna surface in the width direction and the protrusion is from 0.30 times to 0.8 times inclusive of a wavelength corresponding to the predetermined communication frequency.

4. The electronic device according to claim 1, wherein the protrusion extends over an entire length direction of the antenna surface.

5. The electronic device according to claim 1, wherein the second region includes an end of the predetermined surface, and the end of the predetermined surface includes a stepped portion recessed further in a direction opposite to the surface direction of the antenna surface than the antenna surface.

6. The electronic device according to claim 5, wherein the stepped portion extends over an entire length direction of the antenna surface.

7. The electronic device according to claim 5, wherein the stepped portion is opposite to the predetermined surface with respect to a bottom surface of the recess.

8. The electronic device according to claim 5, further comprising:

a radome that is a dielectric, wherein the radome includes a first portion that covers the antenna surface and a second portion that extends from the first portion to abut on the stepped portion.

9. The electronic device according to claim 8, wherein the first portion includes a facing portion parallel to the antenna surface and including a facing region facing the antenna surface, and the facing portion has a uniform thickness.

10. The electronic device according to claim 1, wherein the antenna module includes a plurality of antenna elements, and the plurality of antenna elements are lined up in a row in a length direction of the antenna surface.

11. The electronic device according to claim 1, wherein the antenna module is accommodated within the recess, the antenna surface being outside the recess.

12. The electronic device according to claim 11, wherein a distance in the surface direction of the antenna surface between the antenna surface and the predetermined surface is from 0.03 times to 0.05 times inclusive of a wavelength corresponding to the predetermined communication frequency.

13. The electronic device according to claim 1, wherein the housing has conductivity.

14. The electronic device according to claim 1, wherein the predetermined surface is a side surface of the housing, and the width direction of the antenna surface coincides with a thickness direction of the housing.

15. The electronic device according to claim 1, wherein the predetermined communication frequency is included in a frequency bandwidth of 24.250 GHz to 52.600 GHz.

* * * * *